United States Patent [19]
Ando et al.

[11] Patent Number: 4,970,002
[45] Date of Patent: Nov. 13, 1990

[54] METHOD OF CHROMATOGRAPHIC SEPARATION

[75] Inventors: Masao Ando; Masatake Tanimura; Masao Tamura, all of Tokyo, Japan

[73] Assignee: Mitusbishi Kasei Technoengineers Ltd., Tokyo, Japan

[21] Appl. No.: 336,516

[22] Filed: Apr. 11, 1989

Related U.S. Application Data

[63] Continuation of Ser. No. 137,284, Dec. 23, 1987, abandoned.

[30] Foreign Application Priority Data

Dec. 23, 1986 [JP] Japan .................................. 61-307123

[51] Int. Cl.⁵ .............................................. B01D 15/08
[52] U.S. Cl. .................................. 210/659; 210/198.2; 127/46.2
[58] Field of Search .................... 210/656, 659, 198.2; 127/46.1, 46.2, 46.3

[56] References Cited

U.S. PATENT DOCUMENTS

| | | | |
|---|---|---|---|
| 2,985,589 | 5/1961 | Broughton | 210/198.2 |
| 3,686,117 | 8/1972 | Lauer | 210/659 |
| 4,001,112 | 1/1977 | Barker | 210/659 |
| 4,070,284 | 1/1978 | Fujita | 210/659 |
| 4,267,054 | 5/1981 | Yoritomi | 210/659 |
| 4,332,623 | 6/1982 | Ando | 127/46.2 |
| 4,366,060 | 12/1982 | Leiser | 210/659 |
| 4,379,751 | 4/1983 | Yoritomi | 210/659 |
| 4,402,832 | 9/1983 | Gerhold | 210/659 |
| 4,478,721 | 10/1984 | Gerhold | 210/659 |
| 4,498,991 | 2/1985 | Oroskar | 210/659 |
| 4,724,081 | 2/1988 | Kawahara | 210/659 |

FOREIGN PATENT DOCUMENTS

4215681  8/1967  Japan .................................. 210/198.2

Primary Examiner—Ernest G. Therkorn
Attorney, Agent, or Firm—Sughrue, Mion, Zinn, Macpeak & Seas

[57] ABSTRACT

A chromatographic separation process employing fewer beds packed with an adsorbent, while enabling separation of feedstock fluid, containing a plurality of components which have different degrees of affinity for the adsorbent, into constituent fractions which are withdrawn separately. According to at least one preferred embodiment, a step of supplying feedstock fluid to the simplified separation apparatus is preceded and followed by a step of circulating the fluid through the apparatus, a cycle of supply-desorbing-circulation being carried out repeatedly.

12 Claims, 5 Drawing Sheets

FIG. 1

FIG. 2A
SUPPLY STEP

FIG. 2B
CIRCULATION STEP

FIG. 2C
DESORPTION STEP 1

FIG. 2D
DESORPTION STEP 2

FIG. 2E
CIRCULATION STEP

METHOD OF CHROMATOGRAPHIC SEPARATION

This is a continuation of application Ser. No. 137,284, filed Dec. 23, 1987, now abandoned.

BACKGROUND OF THE INVENTION

The present invention relates to a method by which a fluid mixture containing a plurality of components is chromatographically separated into three or more fractions enriched in the respective components.

Chromatographic separation techniques employing solid adsorbents are extensively used in industrial applications. Among the processes currently in commercial use are a continuous chromatographic separation method that employs a simulated moving-bed system as described in Japanese Patent Publication No. 15681/1967, whose U.S. equivalent is U.S. Pat. No. 2.985,589, and semi-continuous chromatographic separation methods as described in Japanese Patent Publication No. 37008/1981, whose U.S. equivalent is U.S. Pat. No. 4,332,623, and Japanese Patent Publication No. 55162/1985, whose U.S. equivalent is U.S. Pat. No. 4,267,054. These methods of chromatographic separation have met with some commercial success, but they are basically designed for separating mixture of components into two fractions. Great difficulty has been encountered in achieving separation into three or more fractions using these methods.

A simulated moving-bed system requires a minimum of four packed beds. The semi-continuous chromatographic separation method disclosed in Unexamined Published Japanese Patent Application No. 37008/1981 requires three or four packed beds, and the equipment it employs is complicated and expensive.

Further, a method of separation into components A and B has been known in USP 4,267,054 (Japanese Patent Publication No. Sho-60-55162). The USP discloses a method for the chromatographic separation of each of the soluble components of a feed solution containing as major components (1) a component A which is relatively less adsorbed by a solid adsorbent having ion-exchanging or molecular sieve action and (2) a component B which is more selectively adsorbed by the solid adsorbent having ion-exchanging or molecular sieve action, the solid adsorbent having its adsorbency restored by displacing selectively adsorbed components.

However, the above-mentioned method is achieved by only chromatographic separation of the components A and B.

SUMMARY OF THE INVENTION

In view of the foregoing deficiencies, an object of the present invention is to provide a chromatographic process that employs simple equipment to achieve efficient separation of mixture of components into three or more fractions, which separation has been considered difficult to achieve by previously-employed methods.

The process of the present invention which is capable of attaining this object is basically of a type wherein a feedstock fluid, containing a plurality of components having different degrees of affinity for an adsorbent, and a desorbent fluid are alternately supplied into a chromatographic separation system in which the upstream end of a bed packed with the adsorbent is connected to its downstream end by a fluid channel so as to enable the circulation of fluids. The feedstock fluid is passed through the packed bed from its upstream end to its downstream end to form adsorption zones having the concentration distribution of the respective components, followed by subsequent separation into three or more fractions. In this process, the feedstock fluid or a desorbent fluid is supplied into the packed bed at the upstream end so that zones enriched in the respective components are withdrawn as separate fractions, with at least part of the zones in which the respective components are present in admixture being retained within the bed as a non-withdrawal zone. This process is also characterized in that fluids in the packed bed are circulated without supplying any fluid into the bed or withdrawing any fluid therefrom, so that the non-withdrawal zone is situated adjacent to the zone in which the feedstock fluid is supplied, thereby replacing the latter zone with a zone to be withdrawn at the time when the feedstock fluid is supplied into the bed.

DETAILED DESCRIPTION OF THE INVENTION

The present invention provides a process of semicontinuous chromatographic separation that is performed by repeating the procedures of chromatographic separation batchwise using the chromatographic separation system described in the Summary of the Invention. This process includes the following steps:

(i) supplying a feedstock fluid into a packed bed at its upstream end while a fraction enriched in a certain component is withdrawn from the downstream end of the bed (this step is hereinafter referred to as a supply step);

(ii) supplying a desorbent fluid into the packed bed at its upstream end so as to withdraw a fraction enriched in another component from the downstream end of the bed (this step is hereinafter referred to as a desorption step): and (iii) circulating the fluids in the packed bed without supplying any fluid to the bed or withdrawing any fluid from the bed, thereby allowing a zone containing a plurality of components to be moved to the upstream end of the packed bed (this step is hereinafter referred to as a circulation step).

These three steps are cyclically performed in an order that depends on the feedstock fluid to be processed by chromatographic separation.

In separation of three or more components into three fractions at least two zones occur in which a plurality of components are present in mixture. In such a case, it is preferred that components other than those which have the highest and lowest degree of affinity for the adsorbent are recovered in the supply step, with a circulation step being provided both before and after the supply step so that the entire process is performed in the order of supply step—circulation step—desorption step—circulation step. Any other component is obtained as a fraction from the desorption step divided into two or more sub-steps.

The process of the present invention hereinafter will be described in greater detail with reference to the accompanying drawings.

Figure 1:
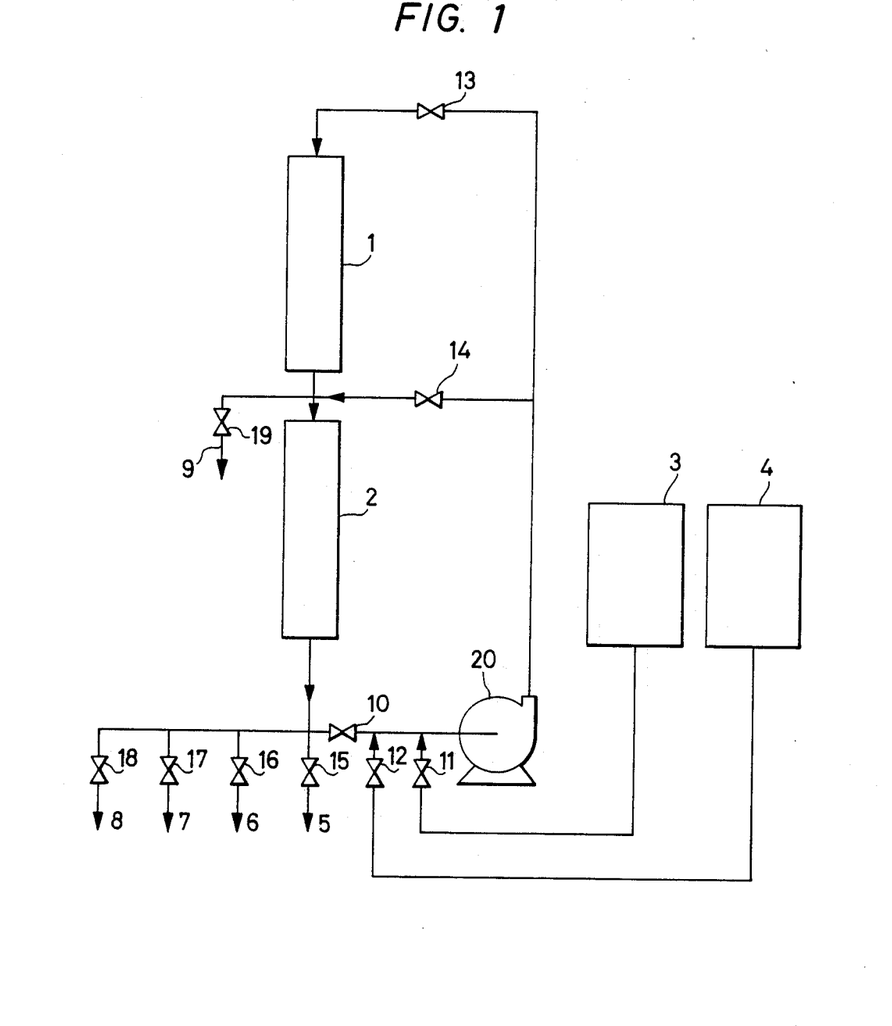
FIG. 1 is a schematic diagram of a chromatographic separation apparatus that may be employed to implement the process of the present invention.
Figure 2A:
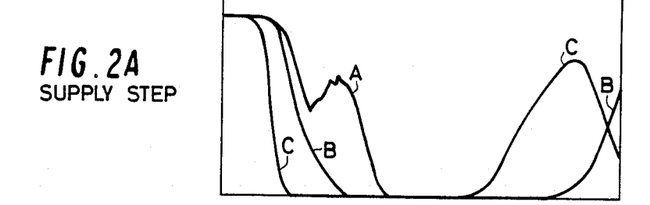
FIGS. 2A–2E show how the concentration distribution of each of the components in a feed mixture in a packed bed varies as it is passed through successive stages of chromatographic separation process.
Figure 2B:
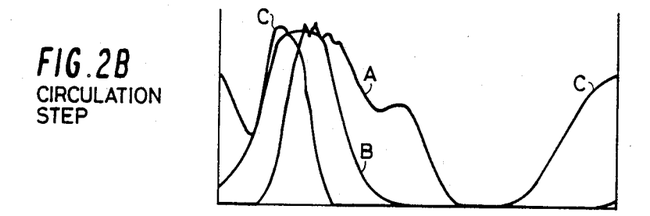
Figure 2C:
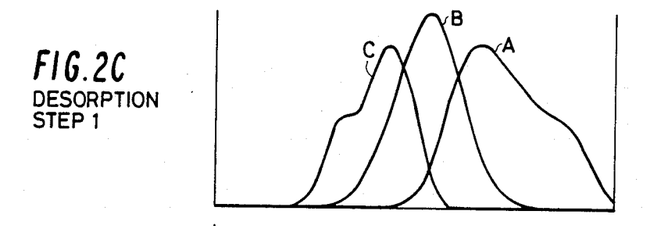
Figure 2D:
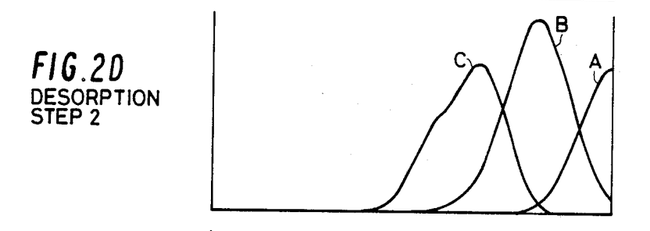
Figure 2E:
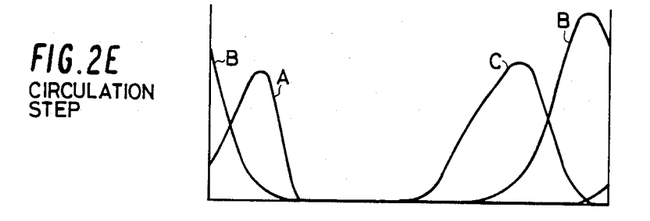

FIG. 1 is a schematic diagram of a chromatographic separation apparatus that may be employed to implement the process of the present invention. Beds 1 and 2 are packed with an adsorbent. These beds may be the same or different in terms of bed capacity or the volume of the adsorbent used. Also shown in FIG. 1 is a tank 3 for the feedstock fluid; a tank 4 for the desorbent fluid, lines 5-9 for withdrawing associated fractions, valves 10-19 for controlling flow of fluids and associated fractions, and a circulating pump 20.

FIGS. 2A-2E show the results of computer simulation of chromatographic separation that was performed on three components. A, B, and C, having different degrees of affinity for an adsorbent according to the process of the present invention. In this figure, the concentration distribution of each of the components, A, B, and C, in the packed bed that is attained at the time of completion of each step is indicated by a curve labelled with the same symbol A, B, or C. In the supply step, the feedstock is supplied into the packed bed at its upstream end (the left end of FIGS. 2A-2E) while component B is withdrawn from its downstream end (right FIGS. 2A-2E). In the desorption step in FIG. 2C, the desorbent is supplied into the packed bed at its upstream end while the component C is withdrawn from the downstream end. In the desorption step in FIG. 2D, the desorbent is supplied into the packed bed at its upstream end and component A is withdrawn from the downstream end.

As is clear from FIGS. 2A-2E, a zone in which components A and B are present in admixture is allowed to move to the upstream end of the packed bed in the circulation step conducted before supplying the feedstock fluid. In the circulation step following the supply of the feedstock fluid, a zone in which components B and C are present in admixture is allowed to move to the upstream end of the bed. In this way, the two mixed zones are situated adjacent to the upstream and downstream ends of the zone in which the feedstock fluid is supplied, with the result that the zone enriched in component B replaces the feedstock fluid supplied zone. Instead of withdrawing the zones in which a plurality of components are present in admixture. they are circulated in such a way that they are situated adjacent to the upstream and downstream ends of the zone in which the feedstock fluid is supplied.

Figure 3:
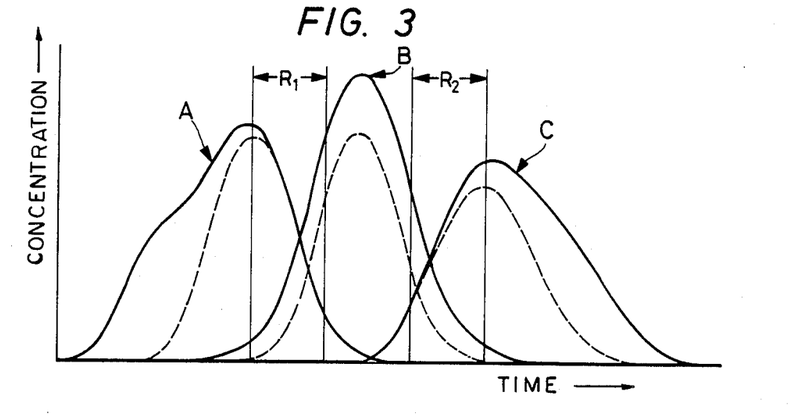
FIG. 3 shows elution curves that compare the results of chromatographic separation by a single pass with those of chromatographic separation as effected by the process of the present invention.

As a result, elution curves that are indicated by solid lines in FIG. 3 are attained and the separation efficiency is sufficiently improved to ensure the recovery of highly pure and concentrated fractions. The curves indicated by dashed lines in FIG. 3 are elution curves showing the results of of separation by a single pass. The curves indicated by solid lines are elution curves showing the state of equilibrium that is attained after performing the process of the present invention through 11 cycles by circulating zone $R_1$ in which components A and B are present in mixture and zone $R_2$ in which components B and C are present in mixture.

In order to ensure that the zone in which the feedstock fluid is supplied is properly replaced by a zone containing a desired product fraction (i.e., a fraction to be withdrawn from the downstream end of the packed bed in the supply step) in the process of the present invention, it is required that the fluids present in these two zones be equal in volume. In practical applications of chromatographic separation. however, this requirement cannot always be met because of the need to recover a product of interest at a desired purity or yield.

If the volume of the desired product fraction is larger than that of the feedstock fluid to be supplied. an additional supply step is provided in which a desorbent fluid is supplied to the packed bed either immediately before or after the feedstock is supplied. so that the product fraction is withdrawn from the downstream end of the packed bed in an amount corresponding to the difference in volume. In the case where this additional step is provided immediately before or after the circulation step, the desorbent fluid must be supplied in the additional step which is not at the upstream end of the packed bed, but rather is at the middle portion thereof, in which the concentration of each component is either zero or substantially zero. This is necessary to ensure that each of the zones containing a plurality of components in mixture that was or is allowed to move in the circulation step will be situated adjacent to the zone in which the feedstock fluid is supplied. In ordinary cases, the desorbent fluid is supplied to the second of two series-connected packed beds (i.e. the bed 2) as shown in FIG. 1.

If the volume of the product fraction to be recovered is smaller than that of the feedstock fluid to be supplied, an additional step is provided in such a way that the step of supplying the feedstock fluid while withdrawing the product fraction is immediately preceded or followed by the step of supplying the feedstock fluid while withdrawing a second fraction. In the case where this additional step is provided immediately after or before the circulation step, the second fraction must be withdrawn from the middle portion of the packed bed in order to ensure that at least part of the zones in which a plurality of components are present in admixture is retained in the bed as a non-withdrawal zone.

As described above, the zones containing a plurality of components in mixture is allowed to circulate so that the separation of the plurality of components is remarkably promoted. However, if no high separation efficiency is required, either one of the circulating steps may be omitted. In this case, the process may be performed in the order of supply step—circulation step—desorption step, or in the order of supply step—desorption step—circulation step.

As described in the foregoing, the process of the present invention includes many variations depending upon the feedstock to be processed by chromatographic separation and on the separating conditions. Typical process variations that can be realized by employing the apparatus shown in FIG. 1 are summarized in Table 1. Each of the processes designated by numbers 1, 5, 6, 7 and 8 in Table 1 can be performed with a single unit of packed bed, and all of the processes can be practiced with three or more units of packed bed. When, symbols are written in two rows for each process in Table 1, the upper symbol designates the fluid to be supplied into the packed bed and the lower symbol designates the fraction to be withdrawn from the packed bed; F signifies the feedstock fluid; D, desorbent fluid; a, b, c and d signify the principal components in the respective fractions. The numerals in parentheses are keyed to the packed beds shown in FIG. 1 into which the feedstock or desorbent fluid is supplied or from which a certain fraction is withdrawn; and R means circulation. The omission of a certain step is indicated by an oblique line. The components a, b, c and d have varying degrees of affinity for the adsorbent, with the affinity trend being as follows: a>b>c>d.

TABLE 1

|   | Supply Step | Circulation step | Desorption step | | Circulation step |
|---|---|---|---|---|---|
| 1 | F (1) b (2) | R | D (1) a (2) | D (1) c (2) | R |
| 2 | F (1) b (2) | D (2) b (2) | R | D (1) a (2) | D (1) c (2) | R |
| 3 | F (1) b (2) | F (1) c (1) | R | D (1) a (2) | D (1) c (2) | R |
| 4 | F (1) b (2) | D (2) b (2) | R | D (1) a (2) | D (1) d (2) | D (1) c (2) | R |
| 5 | F (1) b (2) | | R | D (1) a (2) | D (1) c (2) | R |
| 6 | F (1) b (2) | | R | D (1) a (2) | D (1) c (2) | D (1) b (2) |
| 7 | F (1) b (2) | | | D (1) a (2) | D (1) c (2) | R |
| 8 | F (1) b (2) | | | D (1) b (2) | D (1) a (2) | D (1) c (2) | R |

According to the process of the present invention, a mixture containing a plurality of components having different levels of affinity for an adsorbent can be separated into three fractions enriched in the respective components. Of course, the method of the present invention can be applied to separation of the mixture into four or more components but the efficiency of separation of a fourth and subsequent components is practically the same as what can be achieved in performing chromatographic separation batchwise by a single pass.

The process of the present invention is particularly advantageous to separate and purify various mixtures of saccharides or sugar alcohols using an alkali metal or alkaline earth metal type strong acidic cation-exchange resin as an adsorbent. Specific applications of this process include: separation of fructose from high fructose corn syrup; separation of sucrose from molasses; separation of a starch hydrolyzate into maltose, maltodextrin, etc.; separation of a mixture containing isomaltose and isomaltodextrin into the respective components; and separation of a mixture obtaining sugar alcohols (e.g., sorbitol and maltitol) into the respective components.

The following examples are provided to illustrate further the present invention. However, various modifications of these examples can be carried out without departing from the scope of the present invention.

EXAMPLE 1

Using an apparatus of the type shown in FIG. 1, chromatographic separation of a feedstock (cane molasses) was conducted with a Na-form strong acidic cation-exchange resin (Diaion(tm) UBK-530 K) as an adsorbent and water as a desorbent, respectively. The adsorbent was packed into two series-connected columns each having an inside diameter of 35.5 mm and a packing height of 920 mm. A total of 1,810 ml of the adsorbent was packed to form packed beds.

While the packed bed was held at 75° C., the feedstock fluid (cane molasses) was passed through the bed at a flow rate of 1000 ml/h for effecting cyclic operations of chromatographic separation according to the time schedule shown in Table 2 below.

TABLE 2

|   | Supplied Fluid | Withdrawn Fluid | Valve Opened | Time (min) |
|---|---|---|---|---|
| 1 | feedstock | Sucrose fraction | 11, 13, 16 | 6.0 |
| 2 | — | — | 10. 13 | 18.0 |
| 3 | water | reducing sugar fraction | 12, 13, 15 | 8.4 |
| 4 | water | nonsugar fraction | 12, 13, 17 | 20.4 |
| 5 | — | — | | 4.8 |

Figure 4:
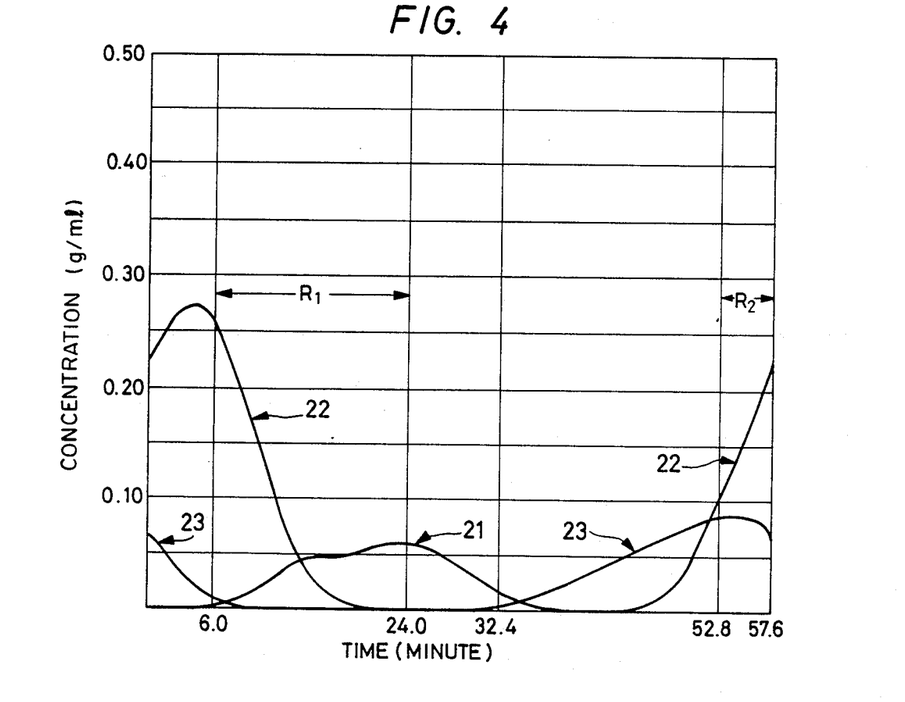
FIG. 4–7 show elution curves for individual components in a feed mixture that were respectively attained in Examples 1–3. a reference example, and Example 4.

Upon completion of 11 cycles, a steady state was reached and the elution curves shown in FIG. 4 were obtained. The y-axis of the graph in FIG. 4 represents the concentration of an individual component (g/ml) and the x-axis denotes time (min.); $R_1$ and $R_2$ represent zones to be circulated; and curves 21 22 and 23 are elution curves for components reducing sugar, sucrose and non-sugar tively. The compositions of the respective fractions and the present recoveries of the respective components are shown in Table 3.

TABLE 3

|   | Feedstock | Sucrose Fraction | Reducing Sugar Fraction | Non-Sugar Fraction |
|---|---|---|---|---|
| Reducing Sugar | 12.0% | 0.1% | 98.1% | 4.5% |
| Sucrose | 55.7% | 87.4% | 0.2% | 23.9% |
| Non-Sugar | 32.3% | 12.5% | 1.7% | 71.7% |
| Concentration | 47.0% | 27.0% | 4.4% | 5.9% |
| Recovery | | 84.2% | | |

EXAMPLE 2

Figure 5:
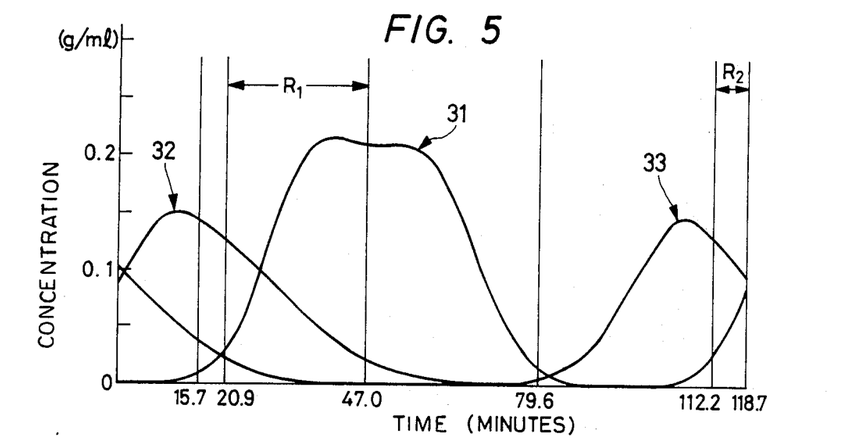

A feedstock (aqueous solution of a mixture of oligosaccharides) having the composition shown in Table 6 was subjected to chromatographic separation according to the time schedule shown in Table 4, using the same apparatus as what was employed in Example 1 except that Diaion(tm) UBK-530 (Na-form strong acidic cation-exchange resin) was used as an adsorbent; and flow rate was 460 ml/h. Elution curves for the respective components that were obtained in a steady state are shown in FIG. 5, in which $R_1$ and $R_2$ represent zones to be circulated, and curves 31, 32 and 33 refer to the respective components, viz., $G_1$, $G_2$ and $G_3+$ content. The compositions of the respective fractions obtained and the percent recoveries of the respective components are shown in Table 6.

TABLE 4

| Step | Supplied Fluid | Withdrawn Fluid | Valves Opened | Time (min) |
|---|---|---|---|---|
| 1 | feedstock | fraction $G_2$ | 11, 13, 16 | 15.7 |
| 2 | water | fraction $G_2$ | 12, 14, 16 | 5.2 |
| 3 | — | — | 10, 13 | 26.1 |
| 4 | water | fraction $G_1$ | 12, 13, 15 | 32.6 |
| 5 | water | fraction $G_3+$ | 12, 13, 17 | 32.6 |
| 6 | — | — | 10, 13 | 6.5 |

TABLE 5

|   | Feedstock | Fraction $G_1$ | Fraction $G_2$ | Fraction $G_3+$ |
|---|---|---|---|---|
| $G_1$ | 41.2% | 3.5% | 95.0% | 2.8% |
| $G_2$ | 27.0% | 70.9% | 4.6% | 4.1% |
| $G_3+$ | 31.8% | 25.6% | 0.4% | 93.1% |
| Concentration | 60% | 18.0% | 14.4% | 8.7% |

TABLE 5-continued

|  | Feedstock | Fraction G$_1$ | Fraction G$_2$ | Fraction G$_3+$ |
|---|---|---|---|---|
| Recovery |  | 89.0% | 96.7% | 71.9% |

EXAMPLE 3

Figure 6:
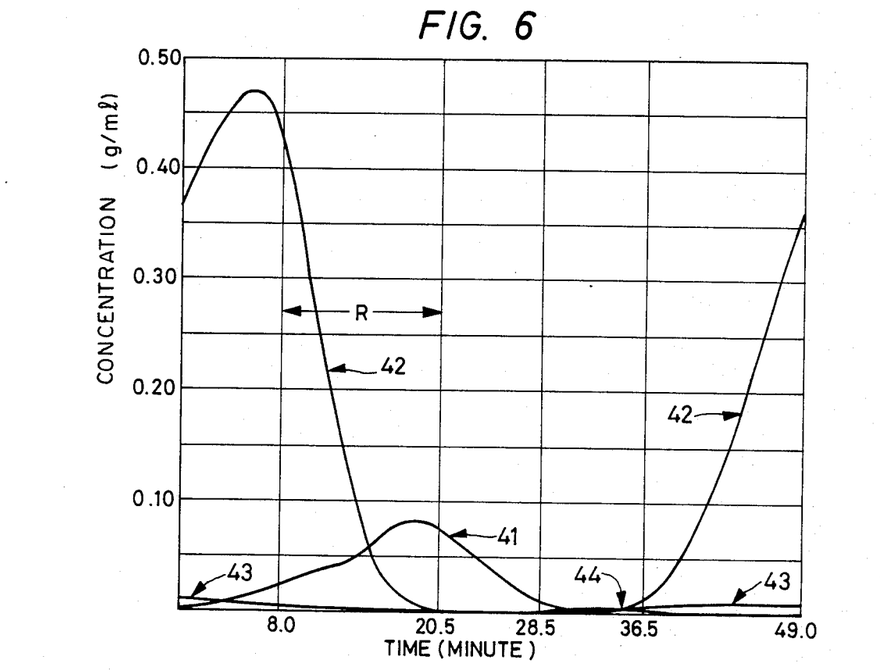

A feedstock (beet molasses) having the composition shown in Table 8 was subjected to chromatographic separation according to the time schedule shown in Table 6, using the same apparatus and adsorbent as what was employed in Example 1, except flow rate was 1200 ml/h. Elution curves obtained for the respective components after a steady state was reached are shown in FIG. 6, in which R represents a zone to be circulated, and curves 41, 42, 43 and 44 refer to the respective components, i.e.. reducing sugar, sucrose, rafinose and non-sugar. The compositions of the respective fractions obtained and the percent recoveries of the respective components are shown in Table 7.

TABLE 6

| Step | Supplied Fluid | Withdrawn Fluid | Valves Opened | Time (min) |
|---|---|---|---|---|
| 1 | feedstock | Sucrose fraction 1 | 11, 13, 16 | 8.0 |
| 2 | — | — | 10, 13 | 12.5 |
| 3 | water | Reducing Sugar Fraction | 12, 13, 15 | 8.0 |
| 4 | water | Non-Sugar Fraction | 12, 13, 17 | 8.0 |
| 5 | water | Sucrose Fraction 2 | 12, 13, 16 | 12.5 |

TABLE 7

|  | Feedstock | Sucrose Fraction | Reducing Sugar Fraction | Non-Sugar Fraction |
|---|---|---|---|---|
| Reducing Sugar | 7.3% | 1.0% | 98.3% | 15.4% |
| Sucrose | 88.6% | 96.0% | 1.7% | 30.8% |
| Raffinose | 3.3% | 2.9% | — | 26.9% |
| Non-Sugar | 0.8% | 0.1% | — | 26.9% |
| Concentration | 60.0% | 24.4% | 4.6% | 1.8% |
| Recovery |  | 99.0% | 80.0% |  |

EXAMPLE 4

Figure 7:
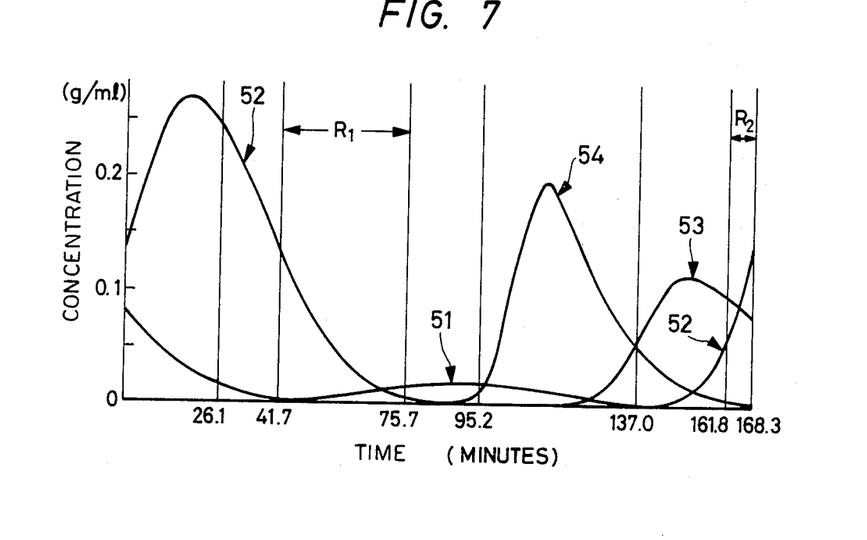

A feedstock having the composition shown in Table 12 was subjected to chromatographic separation according to the time schedule shown in Table 8, using the same apparatus as what was employed in Example 1, except that a Ca-form strong acidic cation-exchange resin (Diaion (tm) UBK-535) was used as an adsorbent, and flow rate was 460 ml/h. Elution curves obtained for the respective components after a steady state was reached are shown in FIG. 7, in which R$_1$ and R$_2$ represent zones to be circulated, and curves 51, 52, 53 and 54 refer to the respective components, i.e., sorbitol, maltitol, DP$_3$ and DP$_4+$. The compositions of the respective fractions obtained and the percent recoveries of the respective components are shown in Table 9.

TABLE 8

| Step | Supplied Fluid | Withdrawn Fluid | Valves Opened | Time (min) |
|---|---|---|---|---|
| 1 | feedstock | maltitol fraction | 11, 13, 16 | 26.1 |
| 2 | water | maltitol fraction | 12, 14, 16 | 15.7 |
| 3 | — | — | 10, 13 | 33.9 |
| 4 | water | sorbitol fraction | 12, 13, 15 | 19.6 |
| 5 | water | DP$_4+$ fraction | 12, 13, 18 | 41.7 |
| 6 | water | DP$_3$ fraction | 13, 13, 17 | 24.8 |
| 7 | — | — | 10, 13 | 6.5 |

TABLE 9

|  | Feedstock | Sorbitol | Maltitol | DP$_3$ Fraction | DP$_4+$ Fraction |
|---|---|---|---|---|---|
| Sorbitol | 4.5% | 86.8% | 0.6% | 1.4% | 7.5% |
| Maltitol | 47.4% | 10.1% | 86.7% | 10.7% | 0.1% |
| DP$_3$ | 20.7% | 0.2% | 12.4% | 70.5% | 6.0% |
| DP$_4+$ | 27.4% | 2.9% | 0.3% | 17.4% | 86.4% |
| Concentration | 60.8% | 2.1% | 23.4% | 13.9% | 13.0% |
| Recovery |  | 40.0% | 95.5% | 60.5% | 88.0% |

What is claimed is:

1. A chromatographic process of a type wherein a feedstock fluid, containing a plurality of components having different degrees of affinity for an adsorbent, said plurality of components including a first component having an intermediate affinity for said adsorbent, a second component having a higher affinity for said adsorbent than said first component, and a third component having a lower affinity for said adsorbent than said first component, and a desorbent are alternately supplied into a chromatographic separation system in which the upstream end of a bed packed with the adsorbent is connected to its downstream end by a fluid channel to enable the fluids to flow circulatively from the upstream end of the packed bed to its downstream end and to withdraw therefrom a plurality of fractions different in components from the feedstock, said process including the following steps:

(i) supplying the feedstock fluid into the packed bed at its upstream end while a fraction enriched in said first component of the feedstock fluid is withdrawn from the downstream end of said bed;

(ii) supplying the desorbent into the packed bed at its upstream end while at least two fractions, comprising a fraction enriched in said second component of the feedstock fluid and another enriched in said third component, are withdrawn in order from the downstream end of the bed; and (iii) circulating the fluid containing an admixture of the first and other components from the downstream end of the packed bed through the fluid channel to its upstream end without supplying any fluid into or withdrawing any fluid from the packed bed, thereby letting the fluid in said packed bed flow down from the upstream end of said bed to its downstream end by a length less than the entire length of the packed bed, said steps (i) to (iii) being performed cyclically and repetitively such that said step (iii) is performed at least once between said steps (i) and (ii) and at a time after said step (ii).

2. A chromatographic process as claimed in claim 1, wherein said step (iii) is performed between said steps (i) and (ii), and at the time after said step (ii).

3. A chromatographic process as claimed in claim 1, wherein said step (iii) is performed between said steps (i) and (ii).

4. A chromatographic process as claimed in claim 1, wherein said step (iii) is performed after said step (ii).

5. A chromatographic process of a type wherein a feedstock fluid, containing a plurality of components having different degrees of affinity for an adsorbent, said plurality of components including a first component having an intermediate affinity for said adsorbent, a second component having a higher affinity for said adsorbent than said first component, and a third component having a lower affinity for said adsorbent than said first component, and a desorbent are alternately supplied into a chromatographic separation system in which the upstream end of a bed packed with the adsorbent is connected to its downstream end by a fluid channel to enable the fluids to flow circulatively from the upstream end of the packed bed to its downstream end and to withdraw therefrom a plurality of fractions different in components from the feedstock, said process including the following steps:

(i) supplying the feedstock fluid into the packed bed at its upstream end while a fraction enriched in said first component is withdrawn from the downstream end of said bed;

(ii) supplying a desorbent fluid into the packed bed at a point intermediate its upstream end and its downstream end while a fraction enriched in the first component is withdrawn from the downstream end of the packed bed;

(iii) supplying the desorbent fluid into the packed bed at its upstream end while at least two fractions, comprising a fraction enriched in said second component, and another fraction enriched in said third component, are withdrawn in order from the downstream end of the packed bed; and (iv) circulating the fluid containing an admixture of the first and other components from the downstream end of the packed bed through the fluid channel to its upstream end without supplying any fluid into the bed or withdrawing any fluid from the bed, thereby letting the fluid in the packed bed flow down from the upstream end of the bed towards its downstream end by a length less than the entire length of the bed, said steps (i) to (iv) being repeated cyclically, wherein said steps (i) to (iii) are performed in order, and said step (iv) is performed at least once between said steps (ii) and (iii), and at a time after said step (iii).

6. A chromatographic process as claimed in claim 5, wherein said step (iv) is performed between said steps (ii) and (iii), and at the time after said step (iii).

7. A chromatographic process as claimed in claim 5, wherein said step (iv) is performed between said steps (ii) and (iii).

8. A chromatographic process as claimed in claim 5, wherein said step (iv) is performed after said step (iii).

9. A chromatographic process of a type wherein a feedstock fluid, containing a plurality of components having different degrees of affinity for an adsorbent, said plurality of components including a first component having an intermediate affinity for said adsorbent, a second component having a higher affinity for said adsorbent than said first component, and a third component having a lower affinity for said adsorbent than said first component, and a desorbent are alternately supplied into a chromatographic separation system in which the upstream end of a bed packed with the adsorbent is connected to its downstream end by a fluid channel to enable the fluids to flow circulatively from the upstream end of the packed bed to its downstream end and to withdraw therefrom a plurality of fractions different in components from the feedstock, said process including the following steps:

(i) supplying the feedstock fluid into the packed bed at its upstream end while a fraction enriched in said first component is withdrawn from the downstream end of said bed;

(ii) supplying an additional amount of the feedstock fluid into the packed bed at its upstream end while a fraction enriched in said third component is withdrawn from the intermediate portion of the bed;

(iii) supplying the desorbent into the packed bed at its upstream end while at least two fractions, comprising a fraction enriched in said second component and another fraction enriched in the third component, are withdrawn in order from the downstream end of the packed bed; and (iv) circulating the fluid containing an admixture of the first and another component from the downstream end of the packed bed through the fluid channel to its upstream end without supplying any fluid into the bed or withdrawing any fluid from the bed, thereby letting the fluid in the packed bed flow down from the upstream end of the bed toward its downstream end by a length less than the entire length of the bed, said steps (i) to (iv) being repeated cyclically, wherein said steps (i) to (iii) are performed in order, and said step (iv) is performed at least once between said steps (ii) and (iii), and at a time after said step (iii).

10. A chromatographic process as claimed in claim 9, wherein said step (iv) is performed between said steps (ii) and (iii), and at the time after said step (iii).

11. A chromatographic process as claimed in claim 9, wherein said step (iv) is performed between said steps (ii) and (iii).

12. A chromatographic process as claimed in claim 9, wherein said step (iv) is performed after said step (iii).

* * * * *